(12) United States Patent
Binnig et al.

(10) Patent No.: US 6,588,932 B2
(45) Date of Patent: Jul. 8, 2003

(54) AIR BEARING BETWEEN A FIRST AND SECOND OBJECT

(75) Inventors: Gerd K. Binnig, Wollerau (CH); Walter Haeberle, Waedenswil (CH)

(73) Assignee: International Business Machines Corporation, Armonk, NY (US)

(\*) Notice: Subject to any disclaimer, the term of this patent is extended or adjusted under 35 U.S.C. 154(b) by 0 days.

(21) Appl. No.: 09/975,131

(22) Filed: Oct. 11, 2001

(65) Prior Publication Data
US 2002/0048416 A1 Apr. 25, 2002

(30) Foreign Application Priority Data
Oct. 24, 2000 (EP) .................................................. 123077

(51) Int. Cl.⁷ ............................................... F16C 32/00
(52) U.S. Cl. ........................................................ 384/1
(58) Field of Search ............................ 384/1, 7, 129, 384/8, 446

(56) References Cited

U.S. PATENT DOCUMENTS

| | | | | |
|---|---|---|---|---|
| 2,278,966 A | \* | 4/1942 | Williams | 384/1 |
| 2,993,739 A | \* | 7/1961 | Hall | 384/1 |
| 3,529,476 A | \* | 9/1970 | Lautenhizer | 384/1 |
| 4,666,315 A | \* | 5/1987 | Scranton | 384/1 |
| 4,971,455 A | \* | 11/1990 | Kawakami et al. | 384/1 |

\* cited by examiner

*Primary Examiner*—Lenard A. Footland
(74) *Attorney, Agent, or Firm*—Robert B. Martin; Bracewell & Patterson, L.L.P.

(57) ABSTRACT

A device has a first object and a second object each with an at least partially parallel surface facing the other. The device also has an oscillator for creating an oscillation of a medium between the first and second objects to generate an air bearing between the first and second objects. Relative movement between the first and second objects is permitted via this configuration. A method for creating an air bearing between two at least partially parallel surfaces facing each other is also provided.

20 Claims, 3 Drawing Sheets

US 6,588,932 B2

AIR BEARING BETWEEN A FIRST AND SECOND OBJECT

BACKGROUND OF THE INVENTION

1. Technical Field

The present invention relates in general to an improved device and method for creating an air bearing. More particularly, the present invention relates to movements with reduced friction between objects.

2. Description of the Prior Art

The movement of objects is bind to loss of energy because of friction. Friction is a force that opposes the motion of an object when the object is in contact with another object or surface. Friction results from two surfaces rubbing against each other or moving relative to one another. It can hinder the motion of an object or prevent an object from moving at all. The strength of frictional force depends on the nature of the surfaces that are in contact and the force pushing them together. This force is usually related to the weight of the object or objects. Usually, the friction between the moving objects of a device, e.g. an engine, turns energy into heat, reducing the device's efficiency. Friction also makes it difficult to slide a heavy object. Two surfaces in contact also tend to attract one another at the molecular level, forming chemical or physical bonds. These bonds can prevent an object from moving, even when it is pushed. If an object is in motion, these bonds form and release. Making and breaking the bonds takes energy away from the motion of the object.

The normal force is the force the object exerts perpendicular to the surface. In the case of a level surface, the normal force is equal to the weight of the object. If the surface is inclined, only a fraction of the object's weight pushes directly into the surface, so the normal force is less than the object's weight.

Different kinds of motion give rise to different types of friction between objects, for example static friction, sliding friction, also called kinetic friction, or rolling friction. While friction allows to convert one form of motion to another, it also converts some energy into heat, noise, and wear and tear on material. Losing energy to these effects often reduces the efficiency of a machine.

Reducing the amount of friction between objects increases the efficiency of the movement. Less friction means less energy lost to heat, noise, and wearing down of material.

Several methods for reducing friction are known. One method involves reducing the roughness of the surfaces in contact. Applying a lubricant to a surface can also reduce friction. Common examples of lubricants are oil and grease. They reduce friction by minimizing the contact between rough surfaces. The lubricant's particles slide easily against each other and cause far less friction than would occur between the surfaces.

A more efficient way to move an object and to reduce friction is to have an air cushion. Air cushions have a long history. Known are, for example, air-cushion vehicles, also called hovercrafts, crafts that operates above the surface of water or land. Such a vehicle is supported on a cushion of air. The air cushion is provided by a large fan that pushes air downward within a flexible skirt attached to the perimeter of the vehicle. The skirt maintains the cushion by restraining the air. It makes the vehicle appear to be operating only a few inches above the surface. The vehicle is moved forward by propellers mounted above the vehicle or by control of the air exhaust through small openings around the skirt.

In magnetic recording, a head is sliding on an air cushion over a disk in order to avoid the contact between the head and the disk which may lead to wear. This is achieved by the specific construction of the head's shape. Moreover, several production or assembly lines using airflows or air bearing conveyers for the transport of materials or goods, e.g. wafer. In mechanical engineering compressed air is blown into bearings, so called air bearings, to achieve reduced friction during rotations.

The most of the aforementioned techniques use a flow of air to generate an air cushion or air bearing. This flow might be generated by a fan. In the micromechanical world, systems allowing reduced friction are nearly unknown. This calls for innovative solutions, since it becomes crucial in the near future, when spinning disks, for example, get smaller and smaller entering the micromechanical regime. Thus, it is an object of the present invention to provide a nearly frictionless system for moving objects relative to each other.

SUMMARY AND ADVANTAGES OF THE INVENTION

In order to achieve the objectives of the present invention, a device comprises a first object and a second object each having an at least partially parallel surface facing each other. The device further comprises an oscillator for creating an oscillation of a medium between the first and second objects to generate an air bearing between the first and second object. Thereby relative movement between the first and second objects is permitted.

A method for creating an air bearing between the first object and the second object each having an at least partially or to some extent parallel surface facing each other is also provided. The method comprising the step of oscillating a medium between the first and second surfaces to generate an air bearing between the first and second objects. Using the device or method, a nearly frictionless movement between the surfaces of the objects can be achieved. Therefore, no lubrication is necessary at all. The invention is particularly well suited for micromechanical applications but is not restricted to them.

In one aspect of the present invention, the device comprises at least a spacer between the first and second object. This is advantageously because then the first object is separated from the second object and the creation of the air bearing can be initiated more easily. When the spacer comprises a cantilever having a contact area with one of the first or second objects or the spacer is a foot, then the advantage occurs that the distance between the first and second object can be exactly defined. This may play a role when several objects are placed on the air bearing. The cantilever can have a tip, then the advantage occurs that the contact area is very small and the forces between the tip and the first or second object can be overcome easily without much power. It is advantageously if many several objects, e.g. robots, have different surfaces, shapes, or weights such that each object starts its movement at a defined resonant frequency. By doing so, individual control of a lot of objects is achievable.

The oscillator for the oscillation of the medium between the first and second object might comprise piezoelectric, capacitance, electromagnetic, or ultrasonic elements. By using the listed elements, the stimulation of the medium to oscillate can be generated efficiently by well-understood techniques. The medium in-between the first and second objects may comprise air, a gas, or a mixture thereof, but also a liquid or a thin liquid might be advantageous for some applications.

It should be noted that not only the medium can be oscillated but also the first and second objects or even a combination thereof. With air bearing is meant that not necessarily air between the first and second object permits relative movement, but also a gas or a liquid or any other suitable medium can be applied in order to reduce the friction between the objects.

If one of the first and second objects comprises an imbalance or unbalance, than an unbalanced movement of one of the first and second objects can be achieved. If the object having the unbalanced movement is encircled by a wall or a tube, than the advantage occurs that this object adjusts itself to a constant rotation. When the first object has a recess for reception of the second object, then the advantage occurs that the second object adjusts or centers itself by the air vibrations. If the second object is a disk or a wheel and its motion is activated by capacitance, magnetic or airflow means, then a high speed motor can be provided.

If the first object encircles at least partly the second object, then the advantage occurs that the device with the first and second object can be operated at different angles. One of the first and second objects is a moving part, also referred to as moving object. Therefore, the moving object can be everything which is useful to move, for example a disk, a tool, a container, a plate, a write/read unit, or a robot.

If the moving object is rotating it appears advantageous if a spindle guides the moving object. Owing the moving object holds its defined position. Also possible is a guide element. For example, a wall or a tube might be applicable that oscillates at its radius. It is also possible to arrange several guide wheels or the like at the circumference of the moving object in order to guide the moving object on a predefined position or place.

The movement of the moving object, e.g. in the x- and y-direction, can be achieved by driving means such as electromagnetic, electrostatic or capacitance elements. For that, coils, electric and dielectric materials can be arranged properly as it is well known by a skilled person. Also possible and easy to implement are airflow means, like jets or fans.

It is favorable that the movement of the moving object by the driving means can be initiated by a single pulse stimulation, because then a longer distance can be covered whilst by periodic stimulation short distances can be covered. Furthermore, a stimulation in different directions can be applied, then the advantage occurs that a rotation of the moving object is achievable. By doing so, a precise motor can be created.

It proves as favorable for the nearly frictionless movement of the moving object, that the moving object only moves when a defined distance to the other object is provided. The air bearing between the first and second object can have different resonant frequencies. This is advantageous, because then several moving objects can be driven at different resonant frequencies which means at different times. An individual control of each second object is therewith possible. The thickness of the air bearing between the first and second objects can be varied by adapting the pressure between the objects. This permits a fine adjustment in the z-direction.

BRIEF DESCRIPTION OF THE DRAWINGS

Preferred embodiments of the invention are described in detail below, by way of example only, with reference to the following schematic drawings. The drawings are provided for illustrative purpose only and do not necessarily represent practical examples of the present invention to scale.

DETAILED DESCRIPTION OF THE PREFERRED EMBODIMENT

In the following, the various exemplary embodiments of the invention are described. Although the present invention is applicable in a broad variety of mechanical applications it will be described with the focus put on a micromechanical application.

Figure 1:
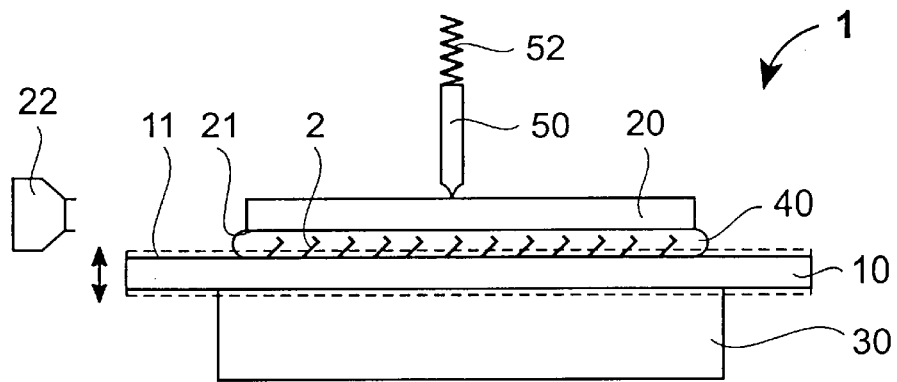
FIG. 1 shows a schematic illustration of a first embodiment according to the present invention.

FIG. 1 shows a schematic illustration of a first embodiment. A nearly frictionless device 1 comprises a first object 10 that here is a substrate 10 and a second object 20 that here is a spinning disk 20. The substrate 10 has a first surface 11 and the spinning disk 20 has a second surface 21, whereby the surfaces 11, 21 facing each other. The substrate 10 is arranged on an oscillator 30 that here is a piezoelectric oscillator 30. The spinning disk 20 is separated from the substrate 10 by a plurality of spacers 2. Here, the spacers 2 are cantilevers with a tip mounted to the substrate 10. The spacers 2 ease the lift off of the spinning disk 20. On top of the spinning disk is a spindle 50 arranged in order to apply a small force to the center of the spinning disk 20. The spindle 50 is mounted on a spring 52, that is deformed when the spinning disk 20 lifts off.

The spinning disk 20 lifts off when the medium, e.g. air, between the spinning disk 20 and the substrate 10 oscillates in such a way that an air bearing 40 occurs that has a thickness and the pressure such that the spinning disk glides on it. The piezoelectric oscillator 30 oscillates the substrate 10 in a direction perpendicular to the first surface 11. This is shown by an arrow and the dotted lines indicating the edges of the oscillating substrate 10.

The air in the gap, i.e. the air in-between the surfaces 11, 21 of the substrate 10 and the spinning disk 20 is actuating as a hard spring, because the air cannot come out on the side of the gab. This works around resonant frequency and through the air there are nearly no linear effects.

A relative movement between the substrate 10 and the spinning disk 20 can be achieved by several driving means or techniques. The movement, for example, can be generated by a capacitor, an electromagnet, an electrostatic element, or an airflow. The rotation of the spinning disk 20 can be initiated by any one of the aforementioned means or techniques. As a driving means is shown an airflow generator or fan 22 to create an airflow which drives the spinning disk 20.

Figure 2:
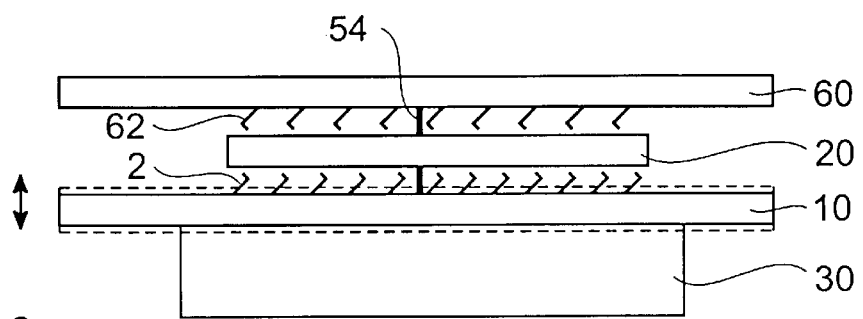
FIG. 2 shows a second embodiment according to the present invention.

FIG. 2 shows a second embodiment, whereby the same reference numerals are used to denote the same or like parts. The device in FIG. 2 comprises the substrate 10 on the piezoelectric oscillator 30 separated from the spinning disk 20 by cantilevers 2. On top of the spinning disk 20 is a plate 60 arranged such that the spinning disk 20 is sandwiched between the substrate 10 and the plate 60. Both 10, 60 are equipped with cantilevers 2, 62. An axis 54 is arranged at the center of the spinning disk 20 to hold the spinning disk 20 at its position. Here, the plate 60, equipped with the cantilevers 62, is used to transform a stepwise rotation as a kind of "linear" motion into a continuous rotation. This represents a motor.

Figure 3A:
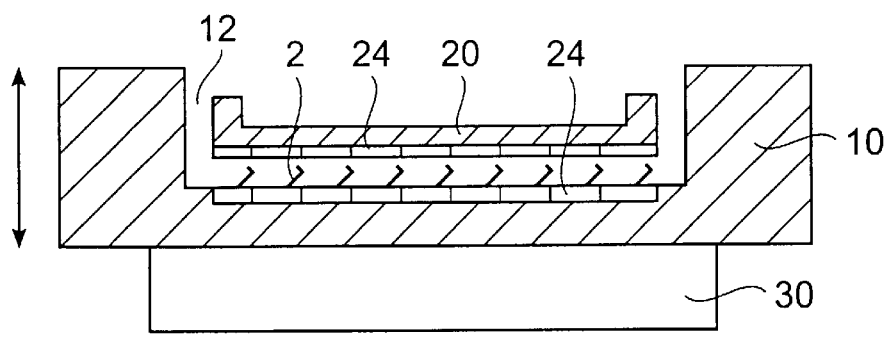
FIG. 3a shows a third embodiment according to the present invention.

FIG. 3a shows a third embodiment in cross-sectional view where the spinning disk 20 is positioned and fixed in a three dimensional nearly frictionless setup. The same reference numerals are used to denote the same or like parts. The substrate 10 has a recess 12 for the reception of the spinning disk 20. Here, the spinning disk 20 has an enlarged surface to achieve a better centering. Also sliders mounted on or attached to the spinning disk 20 would improve the centering. For the sake of simplicity, such sliders are not shown in the figure. Moreover, a capacitor structure 24, short capacitor 24 is arranged on the substrate 10 and the spinning disk 20. The spinning disk 20 is activated to rotate by the capacitor structure 24 or other suitable driving means. If the substrate 10 is activated by oscillation through the piezoelectric oscillator 30 and the air bearing 40 is generated, the spinning disk 20 is lifted off and centered by the air vibration. In the third dimension, i.e. in the z-direction, the disk might be trapped by another oscillating disk like shown in FIG. 2, resulting in a three dimensional air cushion. A nearly frictionless high speed motor can be provided.

Figure 3B:
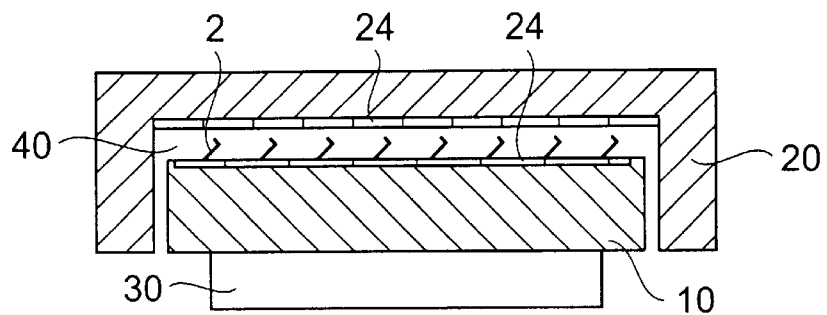
FIG. 3b shows a forth embodiment according to the present invention.

FIG. 3b shows a forth embodiment which is similar to the embodiment described with reference to FIG. 3a. The same reference numerals are used to denote the same or like parts. FIG. 3b shows a nearly frictionless bearing with a rotating hard disk 20, whereby additional parts can be mounted on the hard disk 20 or the substrate 10. During gliding on the air bearing 40 the hard disk 20 centers itself.

Figure 4:
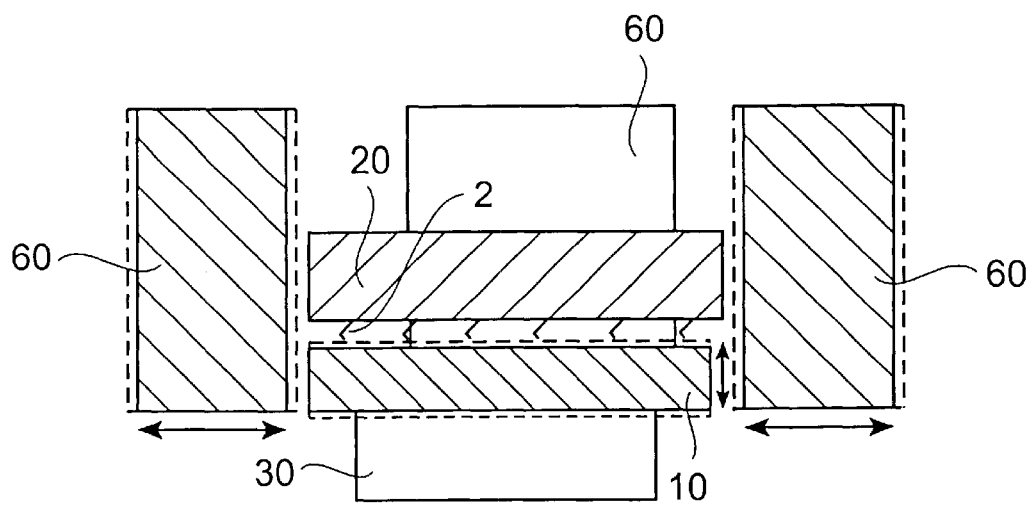
FIG. 4 shows a fifth embodiment according to the present invention.
Figure 5:
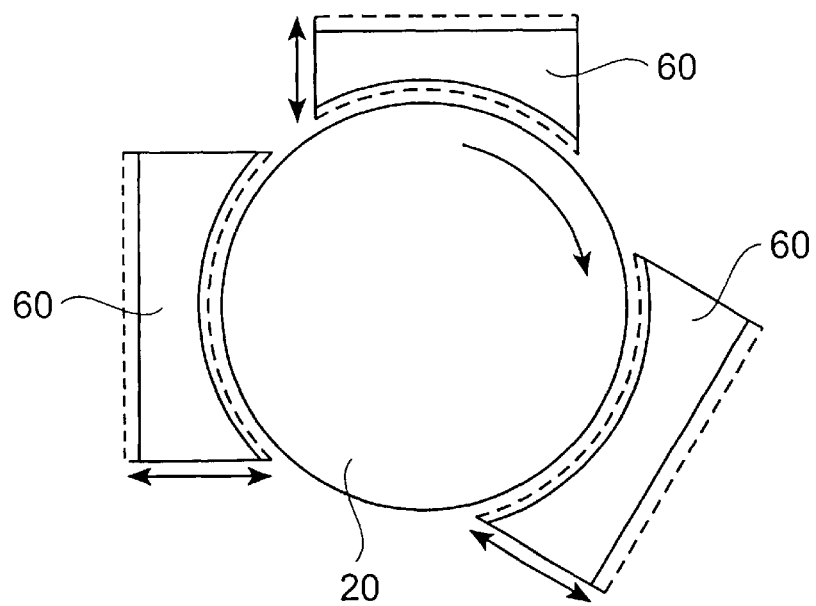
FIG. 5 shows a top view of the embodiment shown in FIG. 4.

FIGS. 4 and 5 show a fifth embodiment in cross-sectional and top view where the spinning disk 20 is surrounded by three guide elements 60. The same reference numerals are used to denote the same or like parts, whereby the substrate 10 has no recess. Each of the three guide elements 60 can be seen as a wall oscillating perpendicular to the direction of the oscillator 30. Such a wall can be made of piezoelectric material. The oscillation of the guide elements 60 into the direction of the center of the spinning disk 20 additionally supports the air bearing and thereby the gliding of the spinning disk 20. The oscillations are indicated by the arrows and the dotted lines indicating the edges of the oscillating substrate 10 and guide elements 60, respectively. The rotation of the spinning disk 20 is initiated by electromagnetic elements, which for the sake of clarity are not shown in the figure.

Figure 6:
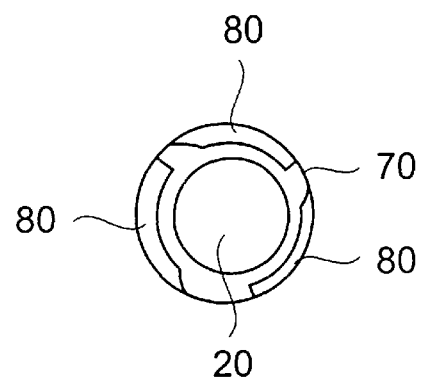
FIG. 6 shows a top view of a further embodiment comprising sliders.

FIG. 6 shows a top view of a further embodiment comprising sliders 80. The spinning disk 20 is arranged within a tube 70, whereby this tube has three sliders 80 arranged at its inner side towards the circumference of the spinning disk 20. The sliders 80 are formed such that the medium between the tube 70 and the spinning disk 20 is compressed in a defined way. The sliders 80 could be arranged as well as on the spinning disk 20. It might be additional advantageous if the radius of the tube 70 varies by oscillation, as described with reference to FIGS. 4 and 5. Furthermore, the spinning disk 20 might have an imbalance or unbalance.

Figure 7:
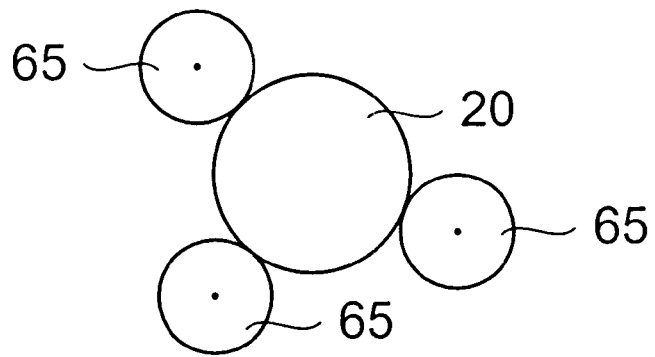
FIG. 7 shows a schematic illustration of a guided disk.

FIG. 7 shows a schematic illustration of a guided spinning disk 20 by guide elements 60. Here, three wheels 65 are arranged at the circumference of the spinning disk 20. Each wheel 65 is fixed at its center. The spinning disk is guided on its outside by the wheels 65 instead of the center.

Figure 8:
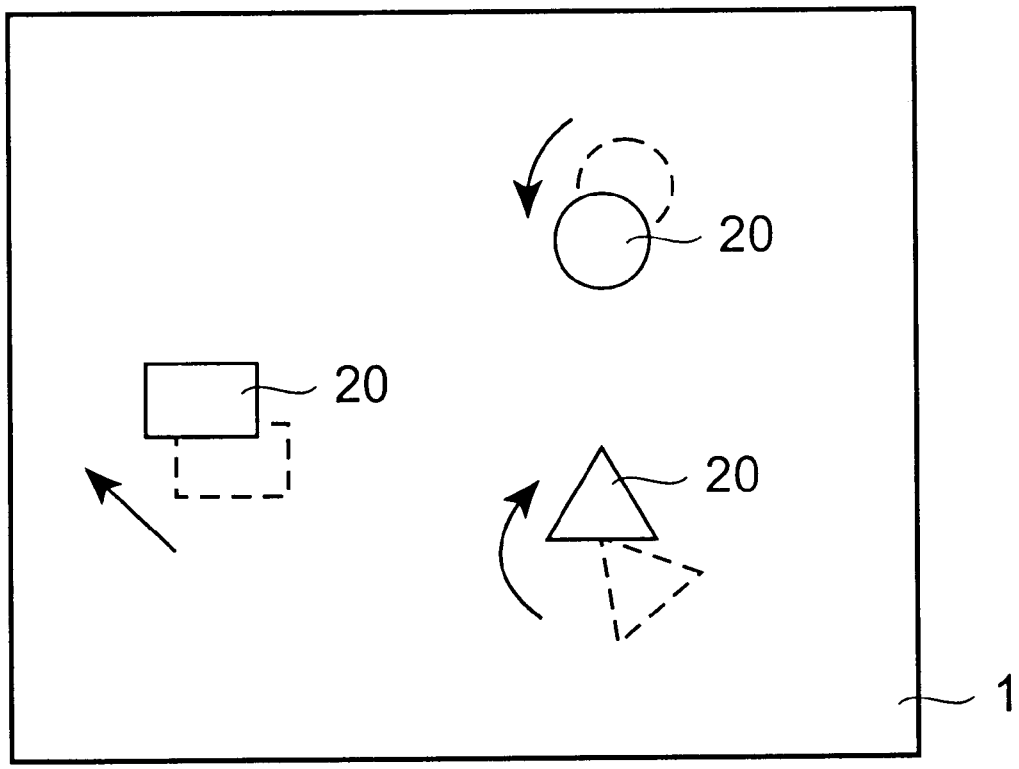
FIG. 8 shows a schematic illustration of an embodiment with several moving objects.

Referring still to FIG. 8, where a schematic illustration of an embodiment with several moving objects 20 is shown. The moving objects 20 are micro-robots 20 which can move individually in x- and y-directions, as indicated by the arrows, on the oscillating substrate 1. The individual movement is achieved by the different resonant frequencies of each micro-robot 20. An individual control of a lot of micro-robots 20 can be provided. As shown, the micro-robots 20 have different shapes. They can also have different weights or spacers 2. The spacers 2, e.g. cantilevers, can be on the side of the substrate 1 or on the side of each micro-robot 20 depending on the application.

By using the air bearing 40, a very precise distance control between the first object 10 and the second object 20 is provided. The working range in an experiment was around 2–4 micrometer in z-direction. The resonant frequency was around 8 kHz, stable, and reproducible. A nearly frictionless movement in the z-direction and also in the x- and y-directions by activating a movement in these directions can be guaranteed. The motion of the moving object 20 in x- and y-directions can be linear as well as rotational by actuators or driving means 22, 24. This driving means 22, 24 can be external or internal. Internal means, the cantilevers by themselves can initiate the movement of the direction by special actuation. The distance of move can be defined by a periodic stimulation of a single pulse. Moreover, the movement in the z-direction can be phase locked to the z actuation. That means, nearly frictionless movement in x- and y-direction is only possible if a defined distance between the first object 10 and the second object 20 is provided. The nearly frictionless movement in x- and y-direction can be achieved in x/y resonant or non resonant mode.

Any disclosed embodiment may be combined with one or several of the other embodiments shown and/or described. This is also possible for one or more features of the embodiments.

What is claimed is:

1. A device (1), comprising:
   a first object (10) and a second object (20) each having an at least partially parallel surface (11, 21) facing each other;
   an oscillator (30) for creating an oscillation of a medium between the first and second objects (10, 20) to generate an air bearing (40) between the first and second objects (10, 20), thereby permitting relative movement between the first and second objects (10, 20); and
   at least a spacer (2) between the first and second objects (10, 20), the spacer comprising a cantilever (2) having a contact area with one of the first or second objects (10, 20).

2. The device of claim 1, wherein the air bearing (40) is dynamic.

3. The device of claim 1, wherein the air bearing (40) between the first and second objects (10, 20) has different resonant frequencies.

4. The device of claim 1, wherein the oscillator (30) comprises an element selected from the group consisting of a piezoelectric generator, a capacitor, an electromagnet, and an ultrasonic generator.

5. The device of claim 1, wherein the relative movement between the first and second objects (10, 20) is achievable by a periodic stimulation.

6. The device of claim 1, wherein the first object (10) encircles at least partly the second object (20).

7. The device of claim 1, wherein one of the first and second objects (10, 20) comprises an element selected from the group consisting of a disk, a tool, a container, a plate, a write/read unit, and a robot.

8. The device of claim 1, wherein the relative movement between the first and second objects (10, 20) is achievable by a single pulse stimulation.

9. The device of claim 1, further comprising a guide element (60, 65, 70) for positioning one of the first and second objects (10, 20).

10. The device of claim 9, wherein the guide element (60, 65, 70) is an oscillating element (60, 70).

11. The device of claim 1, wherein the relative movement between the first and second objects (10, 20) is permitted when one of the first and second objects (10, 20) has a defined distance to the other object (20, 10).

12. The device of claim 1, wherein one of the first and second objects (10, 20) has an imbalance that imparts unbalanced movement in said one of the first and second objects during said relative movement between the first and second objects.

13. The device of claim 1, wherein the medium between the first and second objects (10, 20) comprises a substance selected from the group consisting of air, a gas, and a liquid.

14. The device of claim 1, wherein the relative movement between the first and second objects (10, 20) is achievable by a stimulation in different directions.

15. The device of claim 1, further comprising an electromagnetic element (24) associated with the device for inducing said relative movement between the first and second objects (10, 20).

16. The device of claim 1, further comprising an electrostatic element (24) for the relative movement between the first and second objects (10, 20).

17. A method of creating an air bearing (40), comprising the steps of:

providing c first object (10) and a second object (20), each having an at least partially parallel surface (11, 21) facing each other;

oscillating a medium between the first and second surfaces (10, 20) to generate an air bearing (40) between the first and second objects (10, 20), thereby permitting relative movement between the first and second objects (10, 20); and providing at least a spacer (2) between the first and second objects (10, 20), the spacer a comprising a cantilever (2) having a contact area with one of the first or second objects (10, 20).

18. The method of claim 17, whereby the step of oscillating comprises oscillating at least one of the first and second surfaces (10, 20).

19. The method of claim 17, whereby the step of oscillating comprises creating an increased pressure of the medium between the first and second objects (10, 20) compared to an outside pressure of the medium.

20. The method of claim 17, further comprising the step of varying the thickness of the air bearing (40) between the first and second objects (10, 20) thereby permitting fine adjustment in a z-direction.

* * * * *

UNITED STATES PATENT AND TRADEMARK OFFICE
CERTIFICATE OF CORRECTION

PATENT NO. : 6,588,932 B2
DATED : July 8, 2003
INVENTOR(S) : Binnig et al.

It is certified that error appears in the above-identified patent and that said Letters Patent is hereby corrected as shown below:

Column 5,
Line 34, please replace the word "forth" with the word -- fourth --.

Column 8,
Line 6, please replace the letter "c" with the word -- a --.
Line 15, please delete the word "a".

Signed and Sealed this

Twenty-first Day of October, 2003

JAMES E. ROGAN
*Director of the United States Patent and Trademark Office*